(12) United States Patent
Roychoudhury et al.

(10) Patent No.: US 10,456,970 B2
(45) Date of Patent: Oct. 29, 2019

(54) BLOW MOLDED VEHICLE PARTS WITH FOAM LAYER AND HOLLOW CORE

(71) Applicant: FORD GLOBAL TECHNOLOGIES, LLC, Dearborn, MI (US)

(72) Inventors: Raj S. Roychoudhury, Bloomfield Hills, MI (US); Michael Medoro, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 345 days.

(21) Appl. No.: 14/709,582

(22) Filed: May 12, 2015

(65) Prior Publication Data

US 2016/0332544 A1  Nov. 17, 2016

(51) Int. Cl.
*B29C 49/00* (2006.01)
*B29C 49/22* (2006.01)
(Continued)

(52) U.S. Cl.
CPC .......... *B29C 49/0005* (2013.01); *B29C 44/14* (2013.01); *B29C 48/0017* (2019.02);
(Continued)

(58) Field of Classification Search
CPC . B29C 49/0005; B29C 44/14; B29C 47/0054; B29C 49/22; B60N 2/75
(Continued)

(56) References Cited

U.S. PATENT DOCUMENTS 4,226,464 A * 10/1980 Janz .................. A47C 7/54
  248/118
5,290,087 A * 3/1994 Spykerman .......... B60R 21/055
  280/751

(Continued)

FOREIGN PATENT DOCUMENTS

DE  2757288 A1  7/1979
EP  0834422 A2  4/1998
(Continued)

OTHER PUBLICATIONS

English machine translation of DE2757288.
(Continued)

*Primary Examiner* — Syed A Islam
(74) *Attorney, Agent, or Firm* — Vichit Chea; King & Schickli, PLLC

(57) ABSTRACT

An armrest for a captain's chair of a vehicle includes an outer layer and an inner layer including a foaming agent and defining a hollow core. At least one of the inner layer and the outer layer may include a reinforcing material and/or may be varied in thickness along its length. The armrest may include a third layer defining the hollow core. A related method includes heating a parison having a first and second layers, mixing a foaming agent into the second layer prior to heating, feeding the heated parison between mold halves, clamping the heated parison by moving the mold halves together, and pushing the layers of the heated parison outward, using blown air, such that the first layer is adjacent the mold and the second layer forms a hollow core of the
(Continued)

armrest, the hollow core being partially filled by expansion of the second layer during cooling.

4 Claims, 6 Drawing Sheets

(51) Int. Cl.
*B29C 44/14* (2006.01)
*B60N 2/75* (2018.01)
*B29C 48/00* (2019.01)
*B29K 23/00* (2006.01)
*B29K 105/04* (2006.01)
*B29L 31/30* (2006.01)
*B29C 44/34* (2006.01)
*B29C 44/58* (2006.01)

(52) U.S. Cl.
CPC .............. *B29C 49/22* (2013.01); *B60N 2/75* (2018.02); *B29C 44/3403* (2013.01); *B29C 44/583* (2013.01); *B29K 2023/12* (2013.01); *B29K 2105/043* (2013.01); *B29K 2105/045* (2013.01); *B29L 2031/3026* (2013.01); *B29L 2031/3044* (2013.01)

(58) Field of Classification Search
USPC .......................... 297/411.2, 411.46, 115, 227
See application file for complete search history.

(56) References Cited

U.S. PATENT DOCUMENTS

| | | | | |
|---|---|---|---|---|
| 5,395,161 | A | * | 3/1995 | Spykerman .............. B60N 2/46 297/411.2 |
| 5,445,430 | A | * | 8/1995 | Nichols .................. B60N 2/466 280/751 |
| 6,409,947 | B1 | | 6/2002 | Wandyez |
| 7,014,801 | B2 | | 3/2006 | Imanari et al. |
| 7,235,020 | B1 | | 6/2007 | Dry et al. |
| 7,828,388 | B2 | * | 11/2010 | Thomas .............. B60N 2/4235 296/1.09 |
| 7,959,426 | B2 | | 6/2011 | Taylor et al. |
| 2004/0212241 | A1 | * | 10/2004 | Wu .......................... A47C 5/12 297/451.13 |
| 2014/0271962 | A1 | | 9/2014 | Rogaczewski |

FOREIGN PATENT DOCUMENTS

| | | | | |
|---|---|---|---|---|
| GB | 2315703 | A | * 2/1998 | .......... B29C 44/143 |
| KR | 100448496 | B1 | 9/2004 | |

OTHER PUBLICATIONS

English machine translation of EP0834422.
English machine translation of KR100448496.
Ray Roychoudhury / Michael Medoro, "Blow Molded Armrest with Foam Core," dated Nov. 16, 2014, 9 pages.

* cited by examiner

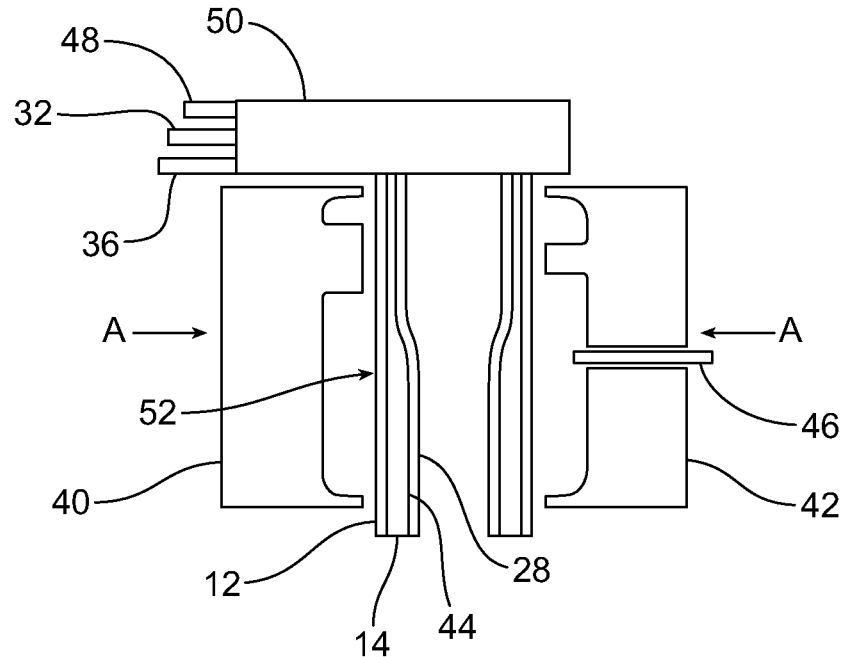
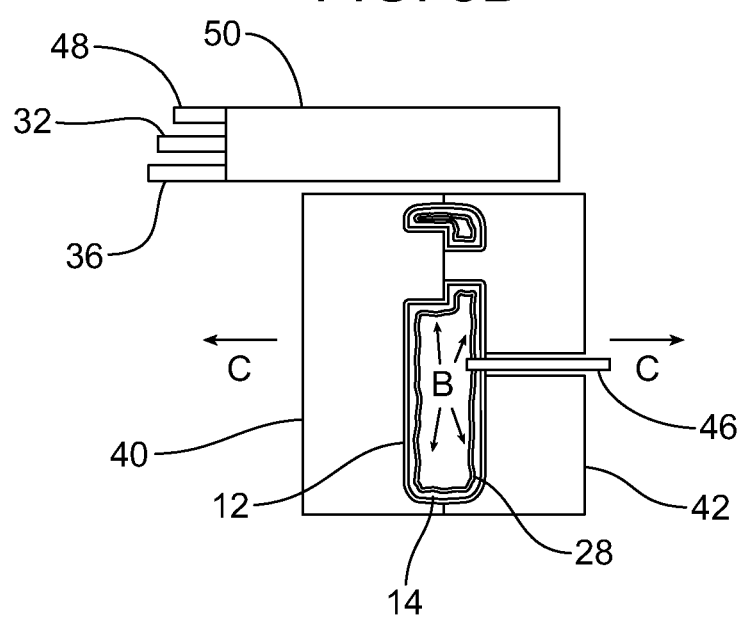

BLOW MOLDED VEHICLE PARTS WITH FOAM LAYER AND HOLLOW CORE

TECHNICAL FIELD

This document relates generally to parts used in a vehicle, and more specifically to a multilayered armrest, used with a captain's seat, and a bumper of a vehicle.

BACKGROUND

Armrests, for example, are a common component of captain's chairs in vehicles. Current captain's chair armrests are produced by many methods. One piece injection molded armrests generally have an open lower surface that includes a plurality of sharp edges which could cause harm during an impact event. Two piece injection molded armrests may alleviate the issue of sharp edges, but require the pieces to be positioned together (snapped or otherwise) and secured with fasteners such as screws. For this and other reasons, two piece injection molded armrests are also relatively expensive to manufacture. A steel stamped armrest molded in foam is yet another means of manufacturing an armrest. Steel stamped armrests, however, are generally heavy and are therefore less desirable. Accordingly, a need exists for an armrest for a captain's chair that is lightweight, formed as a unitary piece, and minimizes, if not eliminates, any sharp edges.

This document relates to parts used in a vehicle including an armrest for a captain's chair and a bumper that are extruded from a multi-layer parison to form a lightweight, unitary, and structurally significant piece that minimizes, if not eliminates, any sharp edges.

SUMMARY

In accordance with the purposes and benefits described herein, an armrest for a captain's chair of a vehicle is provided. The armrest may be broadly described as comprising an outer layer and an inner layer defining a hollow core.

In one possible embodiment, at least one of the inner layer and the outer layer includes a reinforcing material. In another, at least one of the inner layer and the outer layer is varied in thickness along its length. In still another possible embodiment, the hollow core is partitioned.

In yet another possible embodiment, the inner layer includes a plastic and a foaming agent.

In another possible embodiment, an armrest for a captain's seat for a vehicle includes an outer layer, an intermediate foam layer, and an inner layer defining a hollow core.

In still another possible embodiment, at least one of the inner layer, the intermediate foam layer, and the outer layer includes a reinforcing material. In another, at least one of the inner layer, the intermediate layer, and the outer layer is varied in thickness along its length. In yet another, the hollow core is partitioned.

In still another possible embodiment, the inner layer includes a plastic and a foaming agent.

In other possible embodiments, the armrests described above are incorporated into a vehicle.

In accordance with still another possible embodiment, a bumper for a vehicle is provided. The bumper may be broadly described as comprising an outer layer and an inner layer defining a hollow core. At least one of the inner layer and the outer layer may include a reinforcing material. In another possible embodiment, at least one of the inner layer and the outer layer is varied in thickness along its length. In still another possible embodiment, the hollow core is partitioned and the inside layers may be fused together for stiffness. In yet another possible embodiment, the inner layer may include a plastic and a foaming agent.

In another, a bumper may include an outer layer, an intermediate foam layer, and an inner layer defining a hollow core. At least one of the inner layer, the intermediate foam layer, and the outer layer may include a reinforcing material. In another, at least one of the inner layer, the intermediate layer, and the outer layer may be varied in thickness along its length. In yet another, the hollow core is partitioned and the inside layers may be fused together for stiffness.

In accordance with another aspect, a method of forming an armrest for a captain's seat of a vehicle is provided. The method may be broadly described as comprising the steps of: (a) forming a parison having a first layer and a second layer; (b) mixing a foaming agent into the second layer prior to forming the parison; (c) feeding the parison between first and second mold halves shaped like the armrest; (d) clamping the parison by moving the first and second mold halves together to form a mold; and (e) pushing the first and second layers of the parison outward, using blown air, such that the first layer is adjacent the mold and the second layer forms a hollow core of the armrest, the hollow core being partially filled by expansion of the second layer during cooling.

In another possible embodiment, the method may further include the step of reinforcing at least one of the first layer and the second layer prior to forming the parison. The reinforcing step may further include mixing reinforcement fibers into the at least one of the first layer and the second layer of the parison.

In another possible embodiment, the method may further include the step of varying a thickness of at least one of the first layer and the second layer. In still another, the method may further include the step of partitioning the hollow core of the armrest.

In accordance with still another aspect, a method of forming an armrest for a captain's seat of a vehicle is provided. The method may be broadly described as comprising the steps of: (a) forming a parison having a first layer, a second layer, and a third layer; (b) mixing a foaming agent into the second layer prior to forming the parison; (c) feeding the parison between first and second mold halves shaped like the armrest; (d) clamping the parison by moving the first and second mold halves together to form a mold; and (e) pushing the first, second, and third layers of the parison outward, using blown air, such that the first layer is adjacent the mold, the second layer expands between the first layer and the third layer, and the third layer forms a hollow core of the armrest, the hollow core being partially filled by expansion of the second layer during cooling.

In another possible embodiment, the method may further include the step of reinforcing at least one of the first layer, the second layer, and the third layer of the parison. The reinforcing step may further include mixing reinforcement fibers into the at least one of the first layer, the second layer, and the third layer prior to forming the parison.

In another possible embodiment, the method may further include the step of varying a thickness of at least one of the first layer, the second layer, and the third layer. In still another, the method may further include the step of partitioning the hollow core of the armrest.

In accordance with another aspect, a method of forming a bumper for a vehicle is provided. The method may be broadly described as comprising the steps of: (a) forming a parison having a first layer and a second layer; (b) mixing a foaming agent into the second layer prior to forming the parison; (c) feeding the parison between first and second mold halves shaped like the bumper; (d) clamping the parison by moving the first and second mold halves together to form a mold; and (e) pushing the first and second layers of the parison outward, using blown air, such that the first layer is adjacent the mold and the second layer forms a hollow core of the bumper, the hollow core being partially filled by expansion of the second layer during cooling.

In another possible embodiment, the method may further include the step of reinforcing at least one of the first layer and the second layer prior to forming the parison. The reinforcing step may further include mixing reinforcement fibers into the at least one of the first layer and the second layer of the parison. In another possible embodiment, the method may further include the step of varying a thickness of at least one of the first layer and the second layer. In still another, the method may further include the steps of partitioning the hollow core of the armrest and/or fusing the inner layers together to provide additional stiffness or rigidity.

In the following description, there are shown and described several preferred embodiments of the armrest and bumper and the related methods. As it should be realized, the armrest and bumper and methods are capable of other, different embodiments and their several details are capable of modification in various, obvious aspects all without departing from the assemblies and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the armrest and bumper and together with the description serve to explain certain principles thereof. In the drawing figures:

FIG. 8A is a cross-sectional view of a three-layer parison extruded from an extrusion head and extending between mold halves; and FIG. 8B is a cross-sectional view of a three-layer parison pushed out against a mold by blown fluid in order to form the armrest;

Reference will now be made in detail to the present embodiments of the armrest, bumper, and the related methods, examples of which are illustrated in the accompanying drawing figures, wherein like numerals are used to represent like elements.

DETAILED DESCRIPTION

Figure 1:
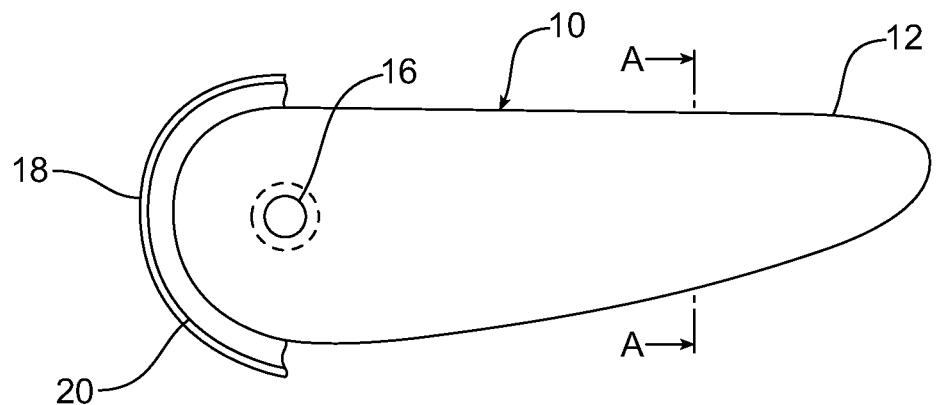
FIG. 1 is a plan side view of an armrest.
Figure 2:
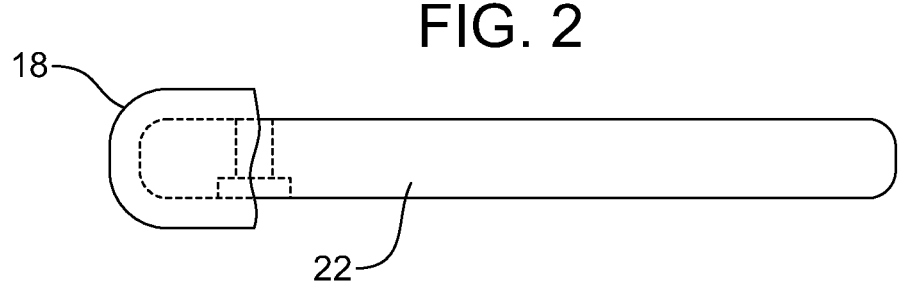
FIG. 2 is a plan bottom view of an armrest.

Reference is now made to FIGS. 1 and 2 which illustrate an embodiment of an armrest 10 for a captain's chair of a vehicle. The armrest 10 is elongated for comfortably supporting the arm of a passenger and includes an outer layer 12 and an inner foam layer 14. The outer layer 12 in the described embodiment is a plastic (e.g., polypropylene). The inner foam layer 14 in the described embodiment is a mixture of plastic (e.g., polypropylene) and a foaming agent. As will be described in more detail below, the foaming agent allows for the inner foam layer to expand after extrusion and during cooling.

A mounting hole 16 for mounting the armrest 10 to a back of a captain's chair extends through the armrest. The armrest 10 is attached to the back of the captain's chair using a suitable fastener (e.g., a bolt or screw). The armrest 10 may be covered by a foam backed fabric or leather 18 as is known in the art. The fabric or leather 18 and foam 20 are partially shown in the figure. As shown in FIG. 2, the bottom of the armrest 10 is a closed, smooth surface 22.

Figure 3:
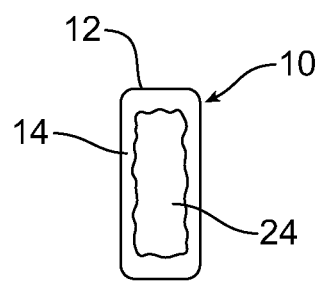
FIG. 3 is a cross-sectional view showing the armrest and, in particular, a hollow core defined by an inner foam layer of the armrest.

As shown in FIG. 3, the inner foam layer 14 of the armrest 10 defines a hollow core 24. Limiting the material within the armrest in this manner lowers the overall weight while providing a suitable rigidity for the armrest. The extent of foaming, i.e., expansion of the inner layer 14, depends on the ratio of plastic to foaming agent utilized and/or the thickness of the extruded inner foam layer. In the described embodiment, the plastic and foaming agent are in pellet form. The two are mixed together at a desired ratio to control the thickness of the inner layer prior to heating and extrusion of the parison in a blow molding machine. Alternatively, the foaming agent could be an inert gas (e.g., nitrogen or carbon dioxide) injected into melted plastic prior to extrusion. One such method of injecting an inert gas is Trexel, Inc.'s Mucell® foaming process. As the parison is extruded, the pressure on the plastic is released and foaming occurs.

Figure 4:
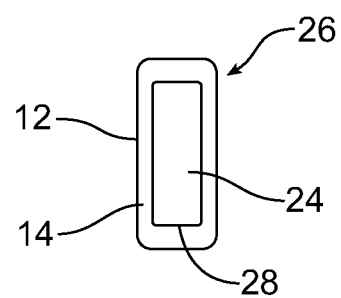
FIG. 4 is a cross-sectional view showing the armrest and, in particular, a hollow core defined by an inner layer of the armrest.

In an alternate embodiment shown in FIG. 4, an armrest 26 includes the outer layer 12 and the inner foam layer 14 and further includes a third, inner, layer 28. The inner layer 28 in the described embodiment is a plastic (e.g., polypropylene) and defines the hollow core 24.

In either of the described embodiments, at least one of the outer layer 12, the inner foam layer 14, and/or the inner layer 28 may include a reinforcing material. The reinforcing material may be fibers, fiberglass, talc, wood, and/or carbon among other fibrous materials known in the art. As will be discussed in more detail below, the reinforcing material in the described embodiments is mixed with the plastic (or plastic and foaming agent in the case of the inner foam layer) prior to heating the plastic for extrusion.

Similarly, in either of the described embodiments, at least one of the outer layer 12, the inner foam layer 14, and/or the inner layer 28 may be varied in thickness across its length. As will be discussed in more detail below, varying the thickness of a layer is accomplished by adjusting the spacing of the extrusion heads during manufacturing.

Figure 5:
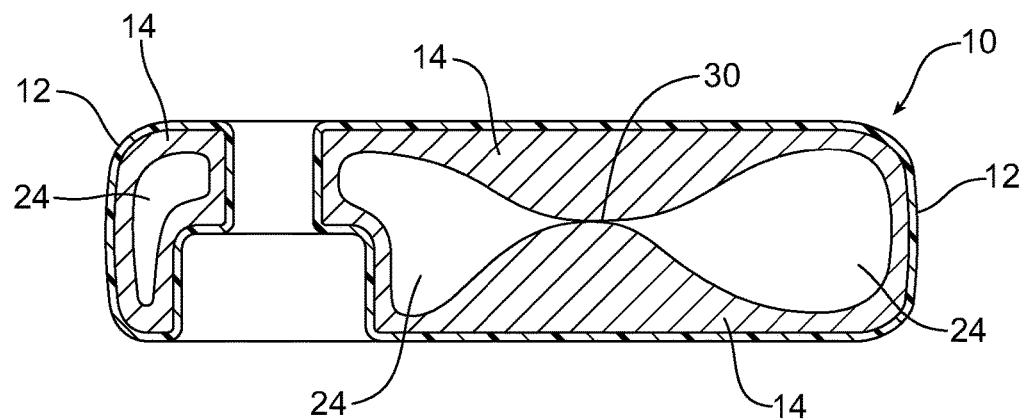
FIG. 5 is a cross-sectional view of an armrest showing partitions in the hollow core formed by pressing the inner foam layer closer along a length of the armrest.

Even more, the hollow core 24 of the armrest 10 may include at least one partition 30 as shown in FIG. 5. In the embodiment described in FIG. 5, the partition 30 is formed by varying the thickness of the inner foam layer 14 at varying locations along the length of the armrest 10 during manufacturing. In this manner, the inner foam layer 14 is thicker such that expansion of the foaming agent, during cooling, bridges the hollow core 24 forming partition 30. Alternately, the ratio of layer thickness between the outer layer and inner foam layer can be adjusted to accomplish the same result, i.e., creation of a partition.

Figure 6:
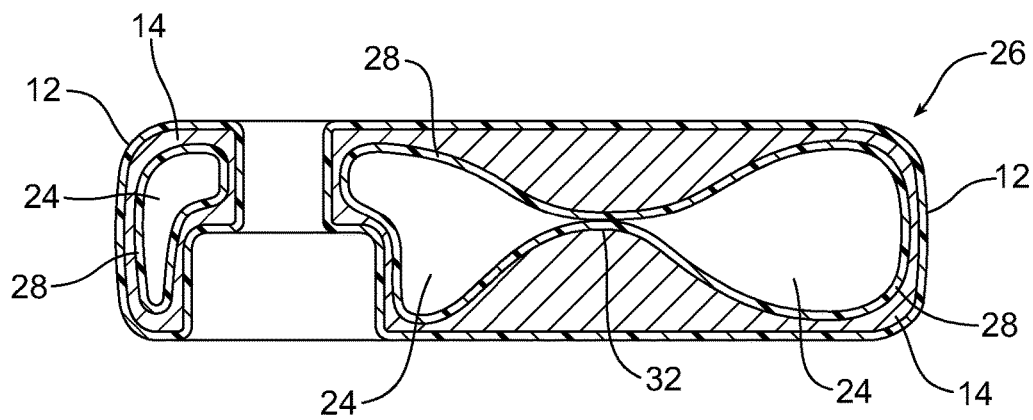
FIG. 6 is a cross-sectional view of an armrest showing partitions in the hollow core formed by pressing the inner layer together along a length of the armrest.

The hollow core 24 of the armrest 26 may likewise include at least one partition 32 as shown in FIG. 6. In this described embodiment, the partition 32 is formed by varying the thickness of the inner foam layer 14 at varying locations along the length of the armrest 10 during manufacturing. In this manner, the inner foam layer 14 is thicker such that expansion of the foaming agent, during cooling, causes the inner layer 28 to bridge the hollow core 24 forming partition 32. Alternately, the ratio of layer thickness between the outer layer, inner foam layer, and inner layer can be adjusted to accomplish the same result, i.e., creation of a partition.

As indicated above, the armrest 10 in the described embodiment is made utilizing a blow molding process. The outer layer 12 which includes plastic pellets is melted in a melting chamber of an extruder (not shown) prior to being fed as a melted plastic 32 to an extrusion head 34. The inner foam layer 14 similarly includes plastic pellets and foaming agent pellets which are mixed together and melted in a separate melting chamber (not shown) prior to being fed as a melted combination 36 of plastic and foaming agent to the extrusion head. The extrusion head 34, in the described embodiment, is a dual extrusion head allowing the outer layer 12 and inner foam layer 14 to be extruded at the same time.

Figure 7A:
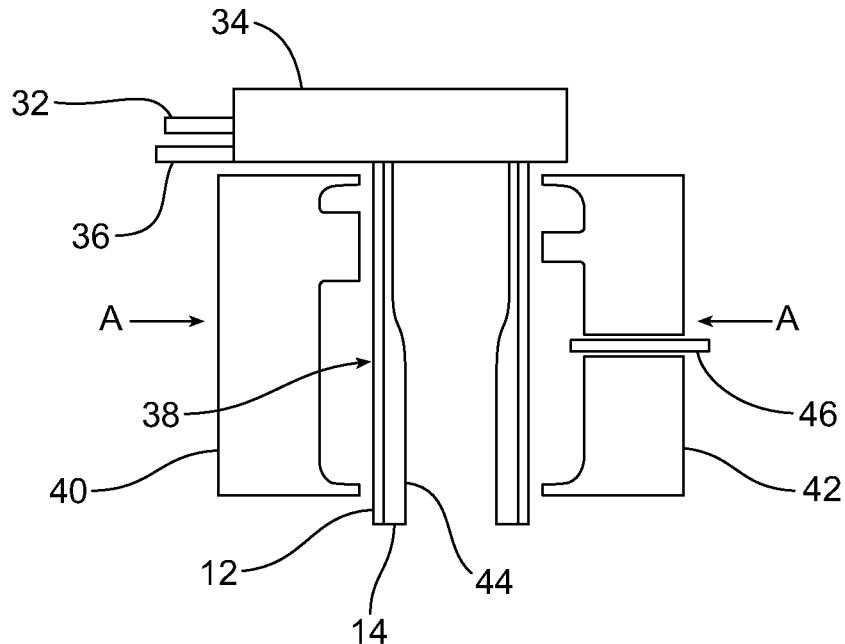
FIG. 7A is a cross-sectional view of a two-layer parison extruded from an extrusion head and extending between mold halves.

As shown in FIG. 7A, a parison 38 which is generally described as a tubular shape of hot plastic is formed by the extrusion head 34 and extends between mold halves 40, 42. The parison 38 includes the outer layer 12 and inner foam layer 14. As shown, the inner foam layer 14 begins expanding (as shown by numeral 44) due to a decrease in pressure as the inner foam layer 14 exits the extrusion head. A cooling of the parison 38 further contributes to the expansion of the inner foam layer 14. As the parison 38 extends from the extruding head 34 the length of the mold, the mold halves 40, 42 come together, as shown by action arrows A, to form the armrest mold and clamp the parison 38 in position.

Figure 7B:
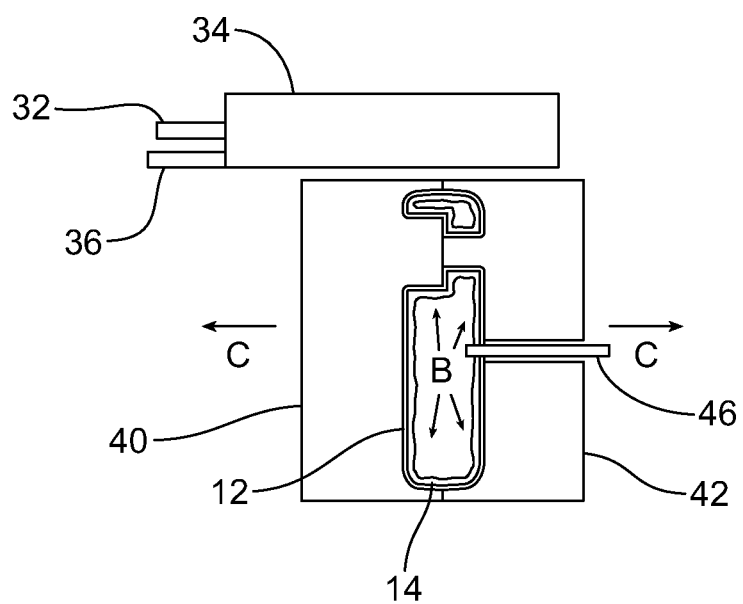
FIG. 7B is a cross-sectional view of a two-layer parison pushed out against a mold by blown fluid in order to form the armrest.

As shown in FIG. 7B, fluid is introduced through tube 46 as shown by action arrows B. In the described embodiment, the fluid is ambient air which pushes the parison 38, including the outer layer 12 and inner foam layer 14, out to match the shape of the mold. The tube 46 may be retractable and insertion though the mold may result in fluid being blown into the open cavity 24 or into the inner foam layer 14. Since the inner foam layer 14 is an open cell foam, the fluid can travel throughout the inner foam layer 14 having the same effect on the outer layer 12 and the inner foam layer. Once the outer layer 12 and inner foam layer 14 have cooled and hardened, the mold halves 40, 42 are opened as shown by action arrows C and the armrest 10 is ejected. Flashing on the ejected armrest 10 may require removal.

In an alternate embodiment described above, a third or inner layer 28 is included in the armrest 26. In this instance, the inner layer 28 is a plastic which is formed by melting plastic pellets in a melting chamber as described above with regard to the outer layer 12. The melted plastic 48 is fed to the extruding head 50 which in the described embodiment is a tri-extrusion head.

As shown in FIG. 8A, a parison 52 which is generally described as a tubular shape of hot plastic is formed by the extrusion head 50 and extends between mold halves 40, 42. The parison 52 includes the outer layer 12, the inner foam layer 14, and inner layer 28. As shown, the inner foam layer 14 begins expanding (as shown by numeral 44) due to a decrease in pressure as the inner foam layer 14 exits the extrusion head 50. A cooling of the parison 52 further contributes to the expansion of the inner foam layer 14. As the parison 52 extends from the extruding head 50 the length of the mold, the mold halves 40, 42 come together, as shown by action arrows A, to form the armrest mold and clamp the parison 52 in position.

As shown in FIG. 8B, fluid is introduced through tube 46 as shown by action arrows B. In the described embodiment, the fluid is ambient air which pushes the parison 52, including the outer layer 12, the inner foam layer 14, and the inner layer 28 out to match the shape of the mold. Again, the tube 46 may be retractable and insertion though the mold may result in fluid being blown into the open cavity 24 or into the inner foam layer 14. Since the inner foam layer 14 is an open cell foam, the fluid can travel throughout the inner foam layer 14 having the same effect on the outer layer 12 and the inner foam layer. Once the outer layer 12, the inner foam layer 14, and the inner layer 28 have cooled and hardened, the mold halves 40, 42 are opened as shown by action arrows C and the armrest 26 is ejected. Flashing on the ejected armrest 26 may require removal.

As noted above, at least one of the outer layer 12, the inner foam layer 14, and/or the inner layer 28, in the described embodiments, may include a reinforcing material. In accordance with the method, reinforcement fibers (not shown) are mixed into at least one of the outer layer 12, the inner foaming layer 14, and/or the inner layer 28 prior to forming the parison. The reinforcing material may be fibers, fiberglass, talc, wood, and/or carbon among other fibrous materials known in the art.

Similarly, in either of the described embodiments, at least one of the outer layer 12, the inner foam layer 14, and/or the inner layer 28 may be varied in thickness across its length. As will be discussed in more detail below, varying the thickness of a layer is accomplished by adjusting the spacing of one or more of the extrusion heads during manufacturing. Alternatively, varying the composition of the inner foam layer 14 to include a higher percentage of foaming agent may also be utilized to vary the thickness of the layer.

Last, alternate embodiments may also include the step of partitioning the hollow core 24 of the armrest 10, 26. In the two layer embodiment of the armrest 10 shown in FIG. 5, the partitions 30, 32 are formed by varying the thickness of the inner foam layer 14 at varying locations along the length of the armrest 10 during manufacturing. In this manner, the inner foam layer 14 is thicker such that expansion of the foaming agent, during cooling, bridges the hollow core 24 forming partition 30. Alternately, the ratio of layer thickness between the outer layer and inner foam layer can be adjusted to accomplish the same result, i.e., creation of a partition.

Figure 9:
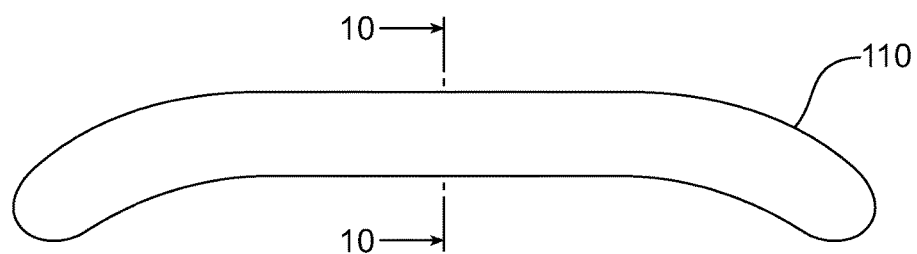
FIG. 9 is a plan top view of a bumper.
Figure 10:
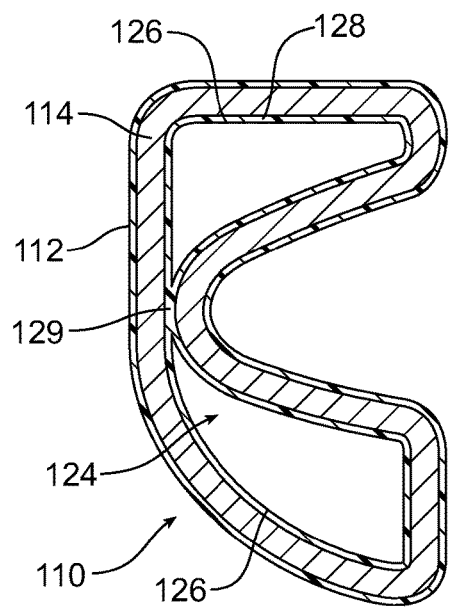
FIG. 10 is a cross-sectional view showing the bumper and, in particular, a hollow core defined by an inner layer of the bumper.

With reference to FIGS. 9 and 10 which illustrate an embodiment of a bumper 110 for a vehicle, the bumper 110 includes an outer layer 112, an inner foam layer 114, and a third, inner, layer 128. The outer layer 112 in the described embodiment is a plastic (e.g., polypropylene). The inner foam layer 114 in the described embodiment is a mixture of plastic (e.g., polypropylene) and a foaming agent. The inner layer 128 in the described embodiment is a plastic (e.g., polypropylene) and defines the hollow core 124. As will be described in more detail below, the foaming agent allows for the inner foam layer to expand after extrusion and during cooling.

As shown in FIG. 10, the inner foam layer 114 of the bumper 110 defines a hollow core 124. Limiting the material within the bumper in this manner lowers the overall weight while providing a suitable rigidity for the bumper. The extent of foaming, i.e., expansion of the inner foam layer 114, depends on the ratio of plastic to foaming agent utilized and/or the thickness of the extruded inner foam layer. In the described embodiment, the plastic and foaming agent are in pellet form. The two are mixed together at a desired ratio to control the thickness of the inner foam layer prior to heating and extrusion of the parison in a blow molding machine. Alternatively, the foaming agent could be an inert gas (e.g., nitrogen or carbon dioxide) injected into melted plastic prior to extrusion. One such method of injecting an inert gas is Trexel, Inc.'s Mucell® foaming process. As the parison is extruded, the pressure on the plastic is released and foaming occurs.

Figure 11:
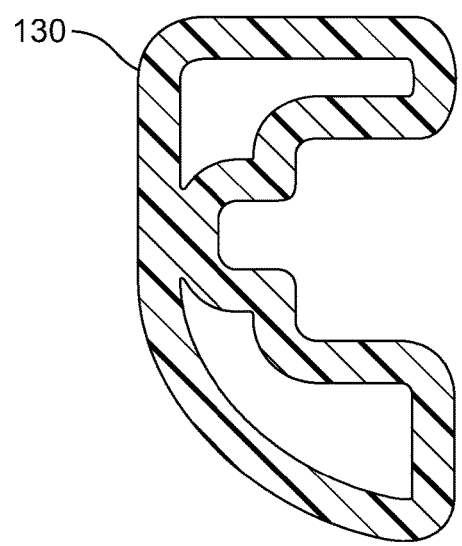
FIG. 11 is a cross-section view of an alternate bumper designed to maximize energy absorption in the event of a collision.

As further shown by reference numeral 129, the inner layers 128 may be fused together during formation of one or more compartments 126 in the hollow core 124. Fusing the inner layers 128 provides additional stiffness. In an alternate embodiment shown in FIG. 11, a bumper 130 is formed in a collapsible shape for energy absorption in the event of an accident. Of course, the bumper 130 of the present invention may be molded into any number of collapsible shapes which provide for energy absorption.

In either of the described bumper embodiments, at least one of the outer layer 112, the inner foam layer 114, and/or the inner layer 128 may include a reinforcing material. The reinforcing material may be fibers, fiberglass, talc, wood, and/or carbon among other fibrous materials known in the art. As will be discussed in more detail below, the reinforcing material in the described embodiments is mixed with the plastic (or plastic and foaming agent in the case of the inner foam layer) prior to heating the plastic for extrusion.

Similarly, in either of the described bumper embodiments, at least one of the outer layer 112, the inner foam layer 114, and/or the inner layer 128 may be varied in thickness across its length. As will be discussed in more detail below, varying the thickness of a layer is accomplished by adjusting the spacing of the extrusion heads during manufacturing.

In alternate embodiments, a bumper may include only the outer layer and the inner foam layer forming a hollow core. The outer layer would be a plastic (e.g., polypropylene) and the inner foam layer would be a mixture of plastic and a foaming agent as in the described embodiment of a bumper. The inner foam layer may be fused together forming compartments within the hollow core as described above for the three layer embodiment.

Figure 12A:
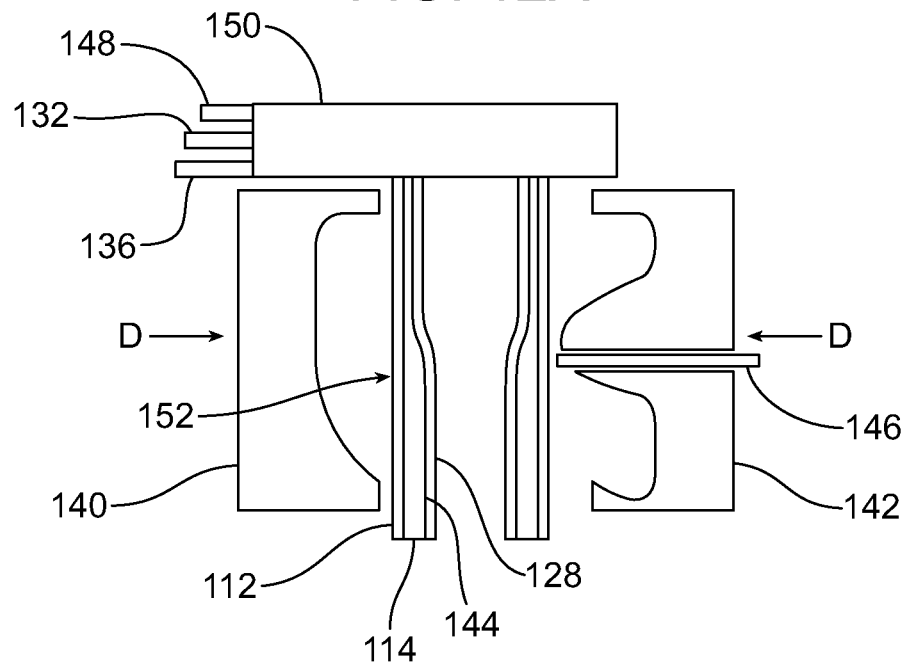
FIG. 12A is a cross-sectional view of a three-layer parison extruded from an extrusion head and extending between mold halves.

In the same manner described above with regard to the armrest 10, the bumper 110 in the described embodiment is made utilizing a blow molding process as shown in FIG. 12A. The outer layer 112 which includes plastic pellets is melted in a melting chamber of an extruder (not shown) prior to being fed as a melted plastic 132 to an extrusion head 134. The inner foam layer 114 similarly includes plastic pellets and foaming agent pellets which are mixed together and melted in a separate melting chamber (not shown) prior to being fed as a melted combination 136 of plastic and foaming agent to the extrusion head. The inner layer 128 is also plastic which is formed by melting plastic pellets in the melting chamber as described above with regard to the outer layer 112. The melted plastic 148 is fed to the extruding head 150 which in the described embodiment is a tri-extrusion head.

The parison 152 which is generally described as a tubular shape of hot plastic is formed by the extrusion head 150 and extends between mold halves 140, 142. The parison 152 includes the outer layer 112, inner foam layer 114, and inner layer 128. As shown, the inner foam layer 114 begins expanding (as shown by numeral 144) due to a decrease in pressure as the inner foam layer 114 exits the extrusion head. A cooling of the parison 152 further contributes to the expansion of the inner foam layer 114. As the parison 152 extends from the extruding head 150 the length of the mold, the mold halves 140, 142 come together, as shown by action arrows D, to form the bumper mold and clamp the parison 152 in position.

Figure 12B:
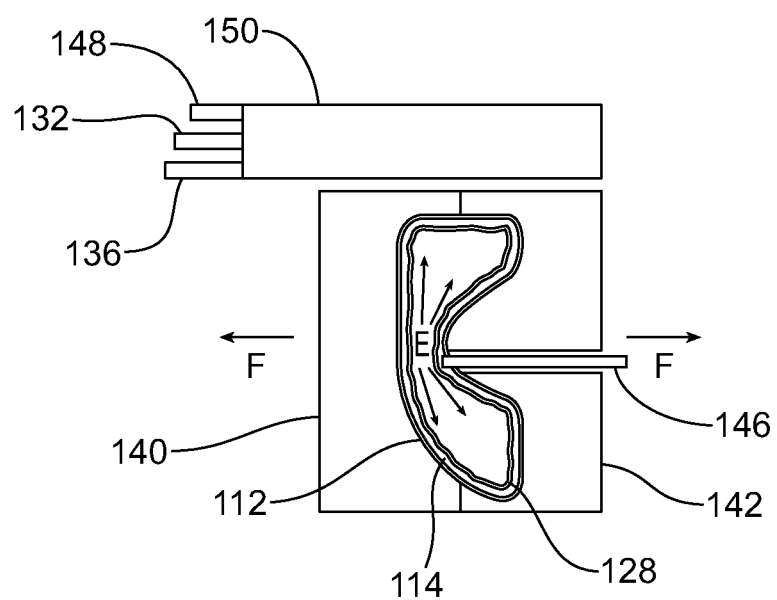
FIG. 12B is a cross-sectional view of a three-layer parison pushed out against a mold by blown fluid in order to form the bumper.

As shown in FIG. 12B, fluid is introduced through tube 146 as shown by action arrow E. In the described embodiment, the fluid is ambient air which pushes the parison 138, including the outer layer 112, the inner foam layer 114, and the inner layer 128 out to match the shape of the mold. The tube 146 may be retractable and insertion though the mold may result in fluid being blown into the open cavity 124 or into the inner foam layer 114. Since the inner foam layer 114 is an open cell foam, the fluid can travel throughout the inner foam layer having the same effect on the outer layer 112 and the inner foam layer. Once the outer layer 112, the inner foam layer 114, and the inner layer 128 have cooled and hardened, the mold halves 140, 142 are opened as shown by action arrows F and the armrest 10 is ejected. Flashing on the ejected bumper may require removal.

In summary, numerous benefits result from providing an armrest and bumper including an outer layer and an inner layer defining a hollow core, and alternate embodiments include a third, or inner, layer which defines the hollow core. Forming the armrest in accordance with the described method provides for an armrest for a captain's chair that is lightweight, formed as a unitary piece, and minimizes, if not eliminates, any sharp edges. Forming the bumper in accordance with the described method similarly provides for a bumper that is lightweight, formed as a unitary piece, and minimizes, if not eliminates, any sharp edges. The bumper may also be formed with higher local stiffness, higher energy absorption, shorter tack-off distances, no tack-off witness marks, and in energy absorbing configurations.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:
1. An armrest for a captain's seat for a vehicle, comprising:
   a mounting hole for mounting the armrest to the captain's seat;
   an outer layer;

an intermediate foam layer, wherein said intermediate foam layer is a mixture of a plastic and a foaming agent; and an inner layer defining a hollow core, wherein the hollow core is partitioned via the mounting hole.

2. The armrest for a captain's seat for a vehicle of claim 1, wherein at least one of said inner layer, said intermediate foam layer, and said outer layer includes a reinforcing material.

3. The armrest for a captain's seat for a vehicle of claim 1, wherein at least one of said inner layer, said intermediate layer, and said outer layer is varied in thickness along its length.

4. A vehicle incorporating the armrest for a captain's seat of claim 1.

* * * * *